Oct. 7, 1941.    B. BROMBERG    2,258,201
APPARATUS AND METHOD FOR SEPARATING VALUES FROM VALUE-BEARING MATERIALS
Filed Dec. 8, 1938    3 Sheets-Sheet 1

Inventor
Benjamin Bromberg
Bacon & Thomas
By
Attorneys

Oct. 7, 1941.  B. BROMBERG  2,258,201
APPARATUS AND METHOD FOR SEPARATING VALUES FROM VALUE-BEARING MATERIALS
Filed Dec. 8, 1938  3 Sheets-Sheet 2
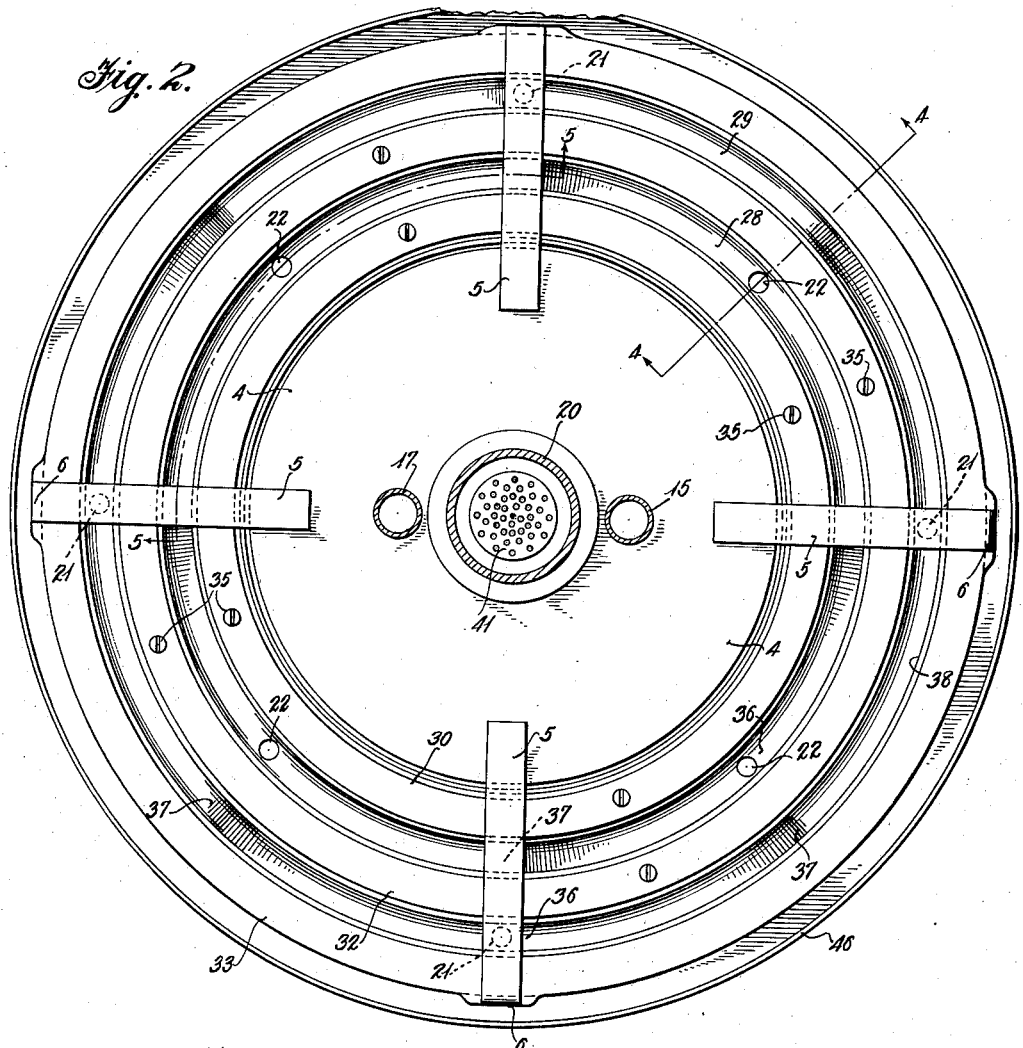
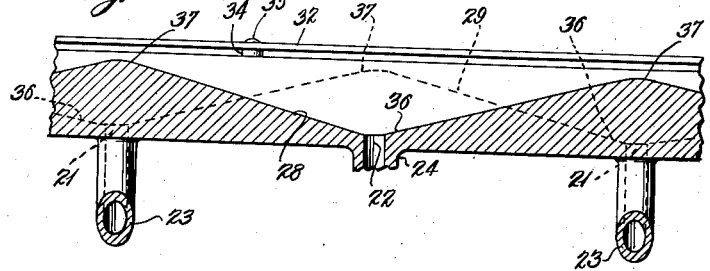
Inventor
Benjamin Bromberg
By Bacon & Thomas
Attorneys

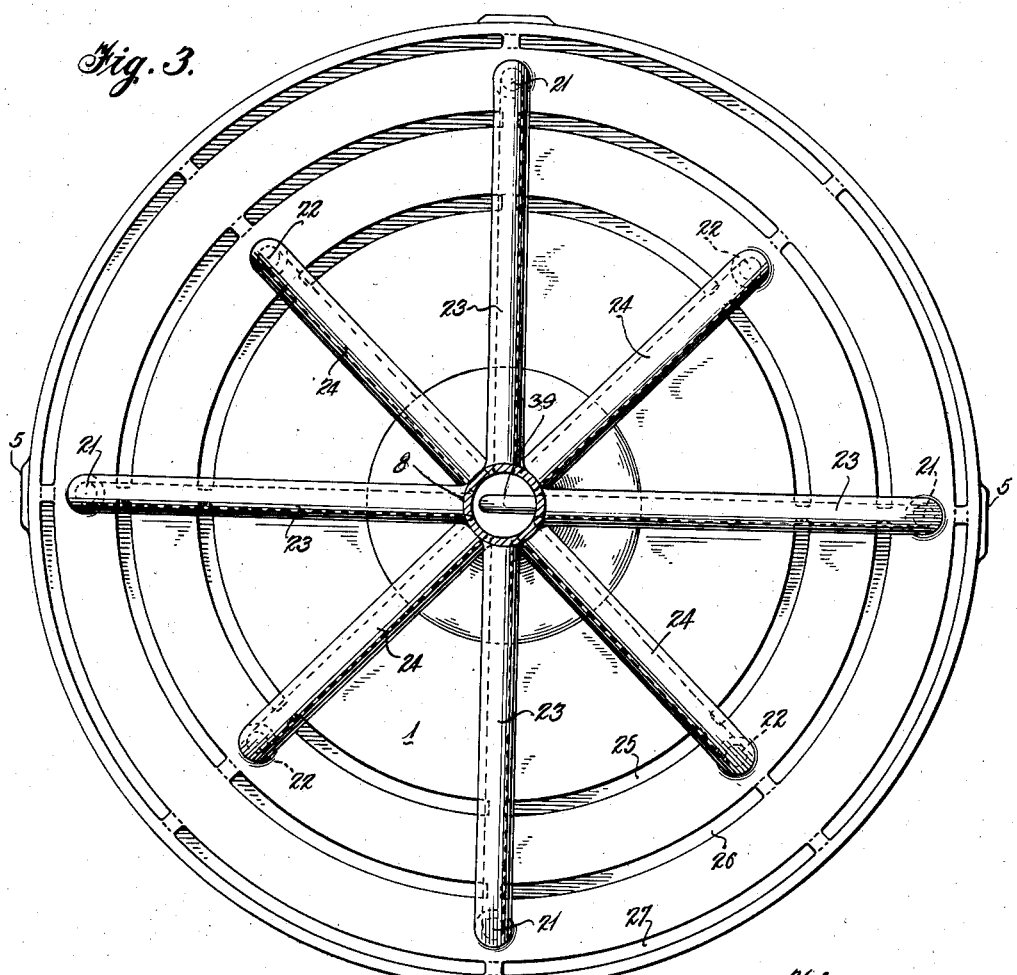
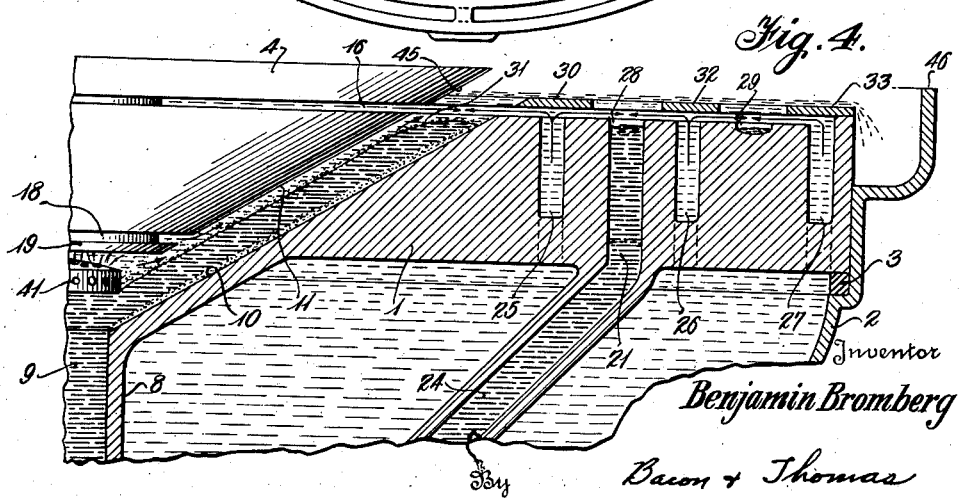

Patented Oct. 7, 1941

2,258,201

UNITED STATES PATENT OFFICE 2,258,201

APPARATUS AND METHOD FOR SEPARATING VALUES FROM VALUE-BEARING MATERIALS

Benjamin Bromberg, Fairbanks, Territory of Alaska

Application December 8, 1938, Serial No. 244,675

13 Claims. (Cl. 209—174)

This invention relates to an apparatus and method for separating or segregating free gold and platinum or other precious metals, having either the property of amalgamating with mercury or having a specific gravity greater than mercury, from the concentrates, pulp, or sands with which such metals are generally associated.

More specifically, the invention relates to a method and apparatus for recovering the free values normally lost by the methods and apparatus now available for use in the separation of precious metals from value-bearing materials or concentrates, and particularly those lost in large scale placer mining operations carried on with dredges, drag lines, hydraulics, etc. In such operations, the black sand, pulp or other material that has been mined is carried by a sufficient quantity of water over a series of variously arranged riffles, mercury traps, etc. Theoretically, in sluicing operations, the free particles of precious metal will lodge in the riffles due to their greater specific gravity, while the gangue is carried off with the water. In practice, however, considerable quantities of fine or flaky particles of precious metals are lost by being carried away with the sluice water and gangue as a result of the riffles becoming packed or substantially filled with the heavy sands associated with the precious metals. When the riffles are in the condition above stated, an appreciable quantity of fine or flaky particles of values are precluded from settling in the riffles and are unavoidably carried out of the sluice boxes by the water together with the gangue. Thus, the loss of values varies in proportion to the extent to which the riffles have become packed with concentrates or sand. The removal of the concentrates from the riffles requires, of course, in nearly all cases, shutting down of the operations. Even frequent cleaning up of the riffles does not solve the problem of losses, and the losses vary in proportion to the amount of concentrates present in the material being sluiced. The loss of values in the above manner is well known to those familiar with the art and is regarded as an unavoidable loss.

The present invention has for its principal object the recovery of those values which have been heretofore regarded as incidental and necessary losses in the carrying on of mining operations.

In the attempt to separate the values from the concentrates removed from the riffles, various forces and apparatus have been employed including centrifugal separators, mechanical agitators, mechanical amalgamators, etc. Such apparatus, however, requires moving parts and has been found not to be entirely satisfactory for the segregation of values from the sands.

Another object of the invention, therefore, is to provide an apparatus which is free from wear by the sand particles and which apparatus will eliminate replacement of parts normally incident to the use of centrifugal separators and mechanical agitators and which will effect a more complete segregation of the values from the sands.

Mercury has been used in various ways to segregate values from the sands, but the recovery is often restricted or interfered with, depending upon the manner in which the mercury is utilized. Mercury has the peculiar characteristic of "flouring" when subjected to a certain degree of agitation. Such "flouring" results in loss of mercury through the adherence of tiny particles thereof to the sands. While the agitation of mercury assists in amalgamation, it is undesirable because of the accompanying "flouring" and because the agitation also interferes with the settling of fine particles of platinum or other non-amalgamating material in the body of mercury. Mercury has the further objectionable property of oxidizing in use and forming a scum on its surface which interferes with amalgamation of the gold and the settling of values in the mercury because of its surface tension.

The present invention takes cognizance of the foregoing difficulties inherent in known apparatus and obviates the same by utilizing certain principles of hydraulics, and by giving special consideration to the specific gravities of the materials involved. In this connection it may be noted that the specific gravity of gold and platinum exceeds that of mercury.

The present invention also takes cognizance of the tendency of gold to amalgamate with mercury and permits such amalgamation, but is primarily intended to minimize the factors which interfere with the settling of values in mercury by gravity and to make it possible for the force of gravity to exert its normal effect and aid in the separation of the precious metals from the concentrates. Gravity is aided in the practice of the present invention by directing a mixture of water and the material to be treated upwardly and outwardly against the inside surface of a general cone-shaped body of mercury. The material to be treated is preferably spread out in a thin layer in inclined conformity with the surface of the mercury, and thus any particles of values that have been liberated from the sand can settle directly into the mercury without being buoyed up or prevented from settling by the buoyant effect of underlying sand particles as would occur if the mass of material treated was passed substantially vertically upward through the body of mercury. The cone-shaped body of mercury thus provides, in effect, an inclined column, the exposed surface of which acts as a floor over which the sand is carried by the sluice water.

The upper surface of the body of mercury is maintained displaced in an inclined position during operation by a substantially constant pressure exerted thereon by the sluice water and the concentrates. The inclination of said surface is such as to aid any oxide or scum thereon to be carried along with the sands and water to the edge of the mercury zone to be ultimately discharged with the sluice water and treated sands. The surface of the mercury to be traversed by the sands is thus kept clean and any values of greater specific gravity than the mercury can readily enter said mercury, being assisted in this action by the weight of the sand and the action of the sand in moving upwards.

An important feature of the invention which will be apparent from the foregoing is that as the sand being treated travels outwardly with the sluice water it gradually spreads over a progressively increasing area of mercury. This spreading out of the sand facilitates the separation of the values from the sand particles, thereby promoting amalgamation and the settling by gravity of non-amalgamating particles into the body of mercury. Any of the values not amalgamated with or settled in the body of mercury, or any particles of the mercury itself which may have adhered to the original value-bearing sands, are preferably further treated to recover the values and mercury. This further treatment comprises subjecting the sands flowing from the conical body of mercury to the action of opposed or intersecting sprays forming, in effect, a water riffle functioning to cause any values or mercury particles to descend by gravity. The invention further contemplates the provision of a body of mercury below the water riffles with which the mercury particles can unite and into which the values can subside.

The spray treatment of the sands after they have left the substantially conical body of mercury is based upon the principle that matter may be held in suspension by suitable turbulence; the greater the turbulent force, the heavier the particle that may be suspended. In accordance with the present invention, two fine streams or sprays of water are directed toward each other from generally opposite directions, whereby a neutral or pressureless area is formed in the meeting waters of the two sprays. The material being treated is preferably flowed onto the top of these sprays by the sluice water. By properly regulating the pressure of the sprays, the values and the particles of mercury present will be permitted to settle through this area, while the lighter sand will be buoyed up and carried away by the sluice water and the spent spray water. This principle of a water riffle may be applied to recover previous metals or mercury from concentrates without the provision of a body of mercury below the meeting portions of the sprays. For convenience, three water riffles have been indicated in the present drawings, and a body of mercury has been shown beneath each water riffle. It is to be understood, however, that any number of water riffles may be provided and that the invention may be practiced with or without the use of mercury below the water riffles.

Hence, another object of the invention is to provide a novel method and apparatus for effecting separation of values or mercury from sands by subjecting the sands to the action of fine hydraulic sprays under a desired predetermined pressure.

Another object of the invention is to provide a method and apparatus whereby values may be continuously, quickly, efficiently and cheaply recovered.

Other valuable and useful objects and advantages of the invention will be apparent to those skilled in the art.

It will be understood that the present invention contemplates the use of the apparatus and method disclosed herein for the recovery of values not only from sands which have been specially selected for treatment, but further contemplates use in large scale mining operations such as referred to hereinabove for the continuous procuring of recoverable values from the sands as these are mined, and to save such values as are now regarded as an unavoidable loss.

In the accompanying drawings:

Figure 2 is a plan view of the apparatus shown in Figure 1;

Figure 3 is a sectional view taken on the line 3—3 of Figure 1;

Figure 4 is an enlarged sectional view taken on the line 4—4 of Figure 2;

Figure 5 is a fragmentary sectional view taken on the line 5—5 of Figure 2; and

It will be understood that portions of these views have been shown to greatly exaggerated scale for the sake of clarity.

Figure 1:
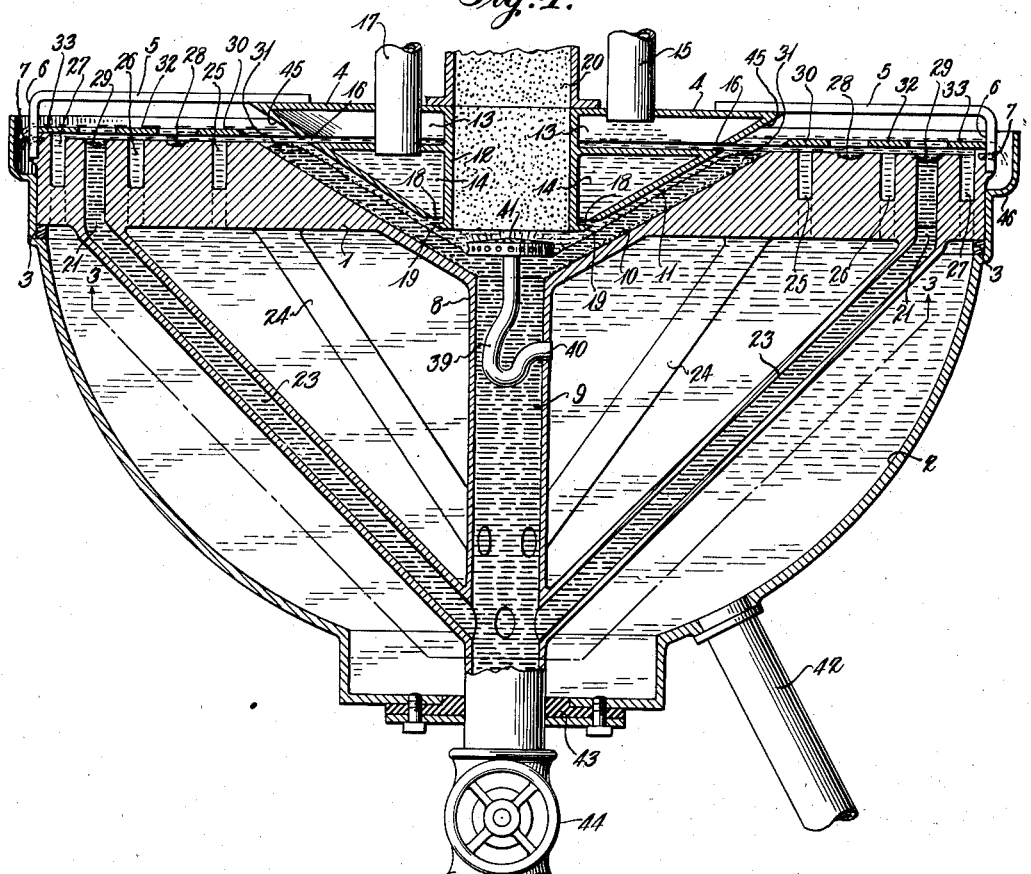
Figure 1 is a more or less diagrammatic vertical sectional view of an apparatus suitable for practicing the principles of the present invention.

Referring now to Figure 1, the main body portion of the separating apparatus is generally indicated by the numeral 1, and is concentrically arranged relatively to a substantially bowl-shaped casing member 2. The casing member 2 is adapted to contain water under pressure for a purpose which will be explained more fully hereinafter. A packing element 3 is disposed between the separator body 1 and the casing 2 and forms a water-tight seal between said body and casing. A cap member generally indicated by 4, provided with a plurality of generally radially extending rigid arms 5, is also arranged concentric with the body 1. The arms 5 are provided with vertical extremities 6 which engage the outer periphery of the body member 1. These extremities of the arms may be secured to the body member 1 by means of screws 7, or any equivalent fastening means.

The separator body 1 is provided with a depending hollow column 8 constituting a well for a body of mercury 9. The interior of the column 8 merges with a generally conical recess 10 formed in the upper face of the body member 1. The cap member 4 is provided with a complementary conical portion 11 adapted to be disposed in the conical recess 10 in the manner indicated in Figure 1.

The cap member 4 has a central opening 12 and a plurality of water chambers 13 and 14 surrounding said opening. A water feed pipe 15 communicates with the interior of the upper chamber 13 to admit water into said chamber, and a circumferential slot 16 arranged approximately in a plane common to the upper surface of the body member 1 provides means for egress of a spray or jet of water from said chamber. A water pipe 17 communicates with the lower chamber 14 to supply water thereto. The water from the chamber 14 flows out through an opening 18 at the lower end thereof and is directed outwardly by a baffle 19.

A section of tubing 20 is arranged above the central opening 12 to conduct sand, pulp, or other material to be treated into the apparatus from any convenient source.

Figure 6:
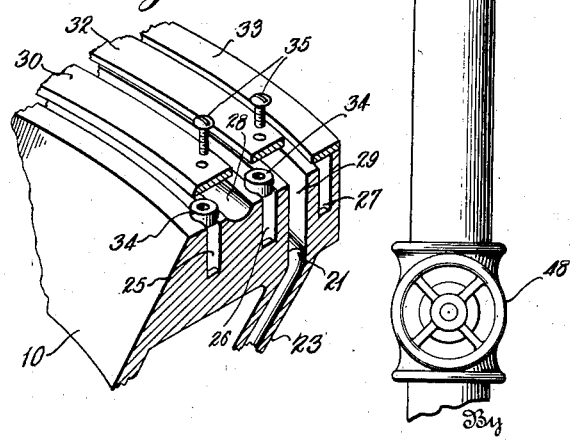
Figure 6 is a fragmentary detached perspective view showing certain details of the apparatus.

The body 1 is preferably provided with a series of circumferentially spaced ports 21 arranged adjacent to the outer periphery thereof, as shown in Figures 1, 2 and 6. A second series of ports 22 is spaced radially inwardly from the ports 21 and staggered relatively thereto. A series of substantially tubular passageways 23 connect the ports 21 with the column 8, and generally similar passageways 24 connect ports 22 with said column, as best shown in Figure 3.

The body member 1 is further provided with a plurality of concentrically arranged water passageways 25, 26 and 27. The lower portions of these passageways communicate directly with the interior of the casing 2. The upper face of the body member 1 is provided with grooves 28 and 29 concentrically arranged between the water passageways 25, 26 and 27, as best shown in Figure 4. The outermost side walls of these grooves serve as riffles. An annular baffle plate 30 is arranged directly above the water passageway 25 so as to direct fine sprays of water radially outwardly toward the groove 28 and radially inwardly toward a space 31 formed between the recess 10 and the conical portion 11 of the cap 4, as indicated by the arrows. A second annular baffle plate 32 overlies the water passageway 26 and deflects water sprays toward the grooves 28 and 29, as further indicated by the arrows. A third annular baffle plate 33 overlies the water passageway 27 and serves to direct a spray of water inwardly toward the groove 29. The annular baffles 30 and 32 may be spaced from the body member 1 by short collars 34, suitably secured to the passageways 25 and 26, see Figure 6. Screws 35 may be used to secure the baffle plates 30 and 32 in assembled relation to the collars 34 and the body member 1. The baffle plates 30, 32 and 33 may be made integral with the body 1 instead of separate, if desired.

The groove 29 connects the ports 21, and the groove 28 connects the ports 22, as shown in Figures 2 and 5. These grooves are preferably made deepest adjacent the ports, as indicated at 36, and shallow intermediate the ports as indicated at 37, thus providing sloping portions for a purpose fully explained hereinafter.

A piece of flexible tubing 39 is disposed within the column 8, as shown in Figure 1. One end 40 of this tubing communicates with the interior of the casing 2 and the opposite end of said tubing is connected with a spraying device 41 floatingly supported by the mercury 9. A pipe 42 is connected with the casing 2 and serves to supply water under pressure to said casing. A gland generally indicated at 43 forms a seal between the casing and the column 8.

It will be understood that before placing the apparatus in operation, sufficient mercury is introduced into the system to bring its level to a desired height in the recess 10, and in the tubes 23 and 24 and the riffle grooves 28 and 29. Inasmuch as the chamber 14 is not under pressure at this time, the mercury can rise into this chamber. A valve 44 is secured to the lower end of the column 8 to prevent the mercury from flowing out of the system.

The operation of the aforedescribed apparatus is as follows:

The value-bearing material is fed by gravity through the pipe 20 from a sluice box or other source into the opening 12 in the cap member 4. A column of a predetermined height of this material is preferably maintained sufficient to displace a portion of the mercury 9 and cause its level to rise in the space 31, chamber 14, and in the grooves 28 and 29. The value-bearing material will naturally force the floating spray 41 downwardly as it displaces the mercury in the recess 10. Water under pressure is now introduced into the chamber 14 through the pipe 17 and this water forces the mercury which has risen in the chamber 14 out into the recess 10. Since the mercury is in fluid condition, it will seek a common level in the space 31 and the grooves 28 and 29. The pressure of the water introduced by the pipe 17 and the head presented by the column of sand in the pipe 20 and the volume of mercury in the system are correlated so that the ultimate level of the mercury is below the top surface of the body 1. The water introduced by the pipe 17 passes, of course, from the chamber 14 through the opening 18 and travels upwardly and outwardly between the conical surface 11 of the cap 4 and the adjacent surface of the mercury. In so passing outwardly, the water under pressure further displaces the mercury to provide an exit for itself.

Water under pressure is next introduced into the casing 2 through the pipe 42 and the pressure is sufficient to cause the water flowing from the spray device 41 to carry the value-bearing sand or other material outwardly and upwardly into the space 31. At the same time, the water introduced through the pipe 17 into the chamber 14 will flow therefrom through the opening 18 above the member 19. This water aids in carrying the value-bearing sands outwardly and upwardly across the upper surface of the now inclined body of mercury in the recess 10.

The pipe 15, as previously stated, communicates with the chamber 13 and provides a source of water to establish a fine spray outwardly through the slot 16 to oppose the spray issuing from beneath the baffle 30, as indicated in Fig. 4.

It will be understood from the foregoing that the height of the column of value-bearing material above the opening 12 is such as to prevent the water discharging from the spray 41 from carrying said material upwardly and out of the opening 12. The water and value-bearing material are, therefore, forced to move outwardly under the element 19 beyond which they are supplemented by additional water flowing through the passageway 18. This additional water is under substantially constant pressure and assists in "flattening" the body of mercury in the recess 10 into a film of substantial thickness. In view of the fact that the water and the sands are of less specific gravity than mercury, and in view of the further fact that water is immiscible with mercury, a mixed layer of water and value-bearing material will be interpositioned between the film of mercury and the conical portion 11 of the cap 4. The value-bearing particles may be said to be buoyantly supported by the film of mercury and are forced upwardly and outwardly against the frictional resistance to flow offered by the mercury with the water to ultimately rise to the mouth of the opening 31. The value-bearing particles, upon being forced to flow upwardly and outwardly, are caused to scour or scuff each other, thereby freeing any values which have adhered thereto. At the same time, if there is any oxide present on the surface of the mercury it will be carried along with the water and sands. The progressively increasing area of mercury encountered as the sands move away from the opening 12 permits the sand to spread or thin out, thus making it easier for values to find their way into the mercury by gravity or amalgamation. These values gradually work their way down the inclined surface of the recess 10 due to the slight turbulence created by the action of the water, and eventually find their way into the column 8. The sand or other material from which the values have been removed is discharged at the mouth of the space 31 and is here subjected to opposed sprays from the slot 16 and baffle 30. The object of the opposed sprays is to remove at this stage any values or particles of mercury that may be clinging to the sands. Any values removed at this point can, of course, settle into the film of mercury in the space 31. The cap 4 has a portion 45 extended above the body 1 for the purpose of preventing the sand or other material from being washed inwardly over the cap. The continuous flow of water from the space 31, the slot 16 and the opening 25 causes the particles of sand or other material to be carried radially outwardly over the baffle 30 into the riffle groove 28. Here, the sand or other material is subjected to the action of the water riffle produced by the fine sprays issuing from under the baffles 30 and 32. Further spraying at this point is intended to loosen any values or mercury which may be clinging to the sand. Further spraying is accorded the sands as they meet another water riffle above the groove 29. Any values removed at these points can settle into the mercury in the riffle grooves 28 and 29 and eventually work their way down the inclined portions of the grooves to the ports 21 and 22 and through the tubes 23 and 24 to be ultimately collected in the column 8.

The sands or other material are ultimately carried radially outwardly over the baffle 33 into a trough 46 surrounding the body 1. Material from the trough 46 may be carried off to be discharged in any suitable manner.

While the foregoing separating operation is occurring, the valve 44 is preferably opened and a second valve 48 disposed therebelow is maintained closed. With this arrangement, the recovered values will settle in the column 8 above the valve 48 and when it is desired to remove these values, the valve 44 may be closed and the valve 48 opened to drain the values into any suitable container.

While the apparatus and method described herein are particularly well adapted for the separation of impure gold and platinum from sand, etc., such gold as is amalgamated will, of course, find its way into the column 8 in the same manner as the unamalgamated values. As amalgamated and unamalgamated values settle into the mercury, the volume of the mercury system is increased. In order to prevent overflow and loss of the mercury from the space 31 and grooves 28 and 29, the valve 48 may be opened and then closed to reduce the mercury to the desired level.

As an alternative, an automatic mercury level maintaining device (not shown) may be connected into the system.

While I have described and illustrated a preferred embodiment and method of practicing the invention, it is to be understood that the invention is not to be restricted beyond the scope required by the appended claims:

I claim:

1. The method of separating values from value-bearing materials which comprises, feeding concentrates onto a body of mercury, mixing water with said concentrates at the surface of said body of mercury to flow the same in the form of a stream, maintaining at least a portion of said body of mercury in an inclined position, and causing said concentrates to travel upwardly over the upper surface of the inclined portion of the mercury.

2. An apparatus for separating values from value-bearing materials comprising, a pair of bodies having opposed surfaces spaced apart to form an upwardly and outwardly inclined passageway therebetween, a body of mercury extending into said passageway and normally substantially filling the same, means for admitting value-bearing material through one of said bodies onto said body of mercury, and means floatingly supported by said body of mercury opposite said value-bearing admitting means for introducing water under pressure to carry said value-bearing materials through said passageway over said body of mercury.

3. An apparatus for separating values from value-bearing materials comprising a body member, a cap member spaced from said body member, said body and cap having opposed surfaces forming an upwardly and outwardly inclined passageway therebetween, a body of mercury extending into said inclined passageway and normally substantially filling the same, means for introducing value-bearing materials onto said body of mercury in the form of a column, and means for introducing water under pressure at the base of said column to wash away the base of said column and to carry said value-bearing materials upwardly and outwardly through said passageway over said body of mercury.

4. An apparatus for separating values from value-bearing materials comprising, a body member, a well in said body member, a body of mercury in said well, a cap member superimposed upon said body of mercury and having an upwardly and outwardly inclined lower face, means for admitting value-bearing materials onto said body of mercury, and means for introducing water under pressure to provide a vehicle for carrying said value-bearing materials in an upward and outward direction between the lower face of said cap member and said body of mercury.

5. An apparatus for separating values from value-bearing materials comprising, a pair of superposed bodies spaced apart to form a passageway therebetween, one of said bodies having an upwardly and outwardly inclined lower face forming a wall of said passageway, a body of mercury extending into said passageway and normally substantially filling the same, means for introducing value-bearing materials onto said body of mercury adjacent the entrance of said passageway, means for introducing water under pressure adjacent the entrance of said passageway to carry said value-bearing material outwardly through said passageway between said inclined surface and said body of mercury, and means for providing sprays of water at the exit of said passageway.

6. An apparatus for separating values from value-bearing materials comprising, a body member, a well in said body member including a recess having a generally concave bottom wall portion, a cap member having a lower generally convex wall portion spaced from the bottom wall of said recess and sloping upwardly and outwardly, a body of mercury in said well normally substantially filling the space between said body and cap members, an opening in said cap member for admitting value-bearing materials onto said body of mercury, and a passageway in said cap member for introducing water under pressure into said recess to provide a vehicle for carrying said value-bearing material over said body of mercury in an upward and outward direction.

7. In an apparatus for separating values from value-bearing materials comprising, a pair of bodies spaced apart to form a passageway therebetween, one of said bodies having an upwardly and outwardly inclined lower face, a body of mercury extending into said passageway and normally substantially filling the same, means for introducing value-bearing materials onto said body of mercury adjacent the entrance of said passageway, means for introducing water under pressure adjacent the entrance of said passageway to carry said value-bearing materials upwardly and outwardly through said passageway over said body of mercury, and a riffle groove in the other of said bodies disposed in the path of the discharge from said passageway.

8. An apparatus for separating values from value-bearing materials comprising, a body member, a second member spaced from said body member to form a passageway therebetween, said second member having an upwardly and outwardly inclined lower face, a well communicating with said passageway, a body of mercury in said well and extending into said passageway and normally substantially filling the same, means for introducing value-bearing materials onto said body of mercury adjacent the entrance of said passageway, means for introducing water under pressure adjacent the entrance of said passageway to carry said value-bearing materials upwardly and outwardly through said passageway over said body of mercury, a riffle groove in said body member, arranged in the path of the discharge from said passageway, and a body of mercury in said riffle groove.

9. An apparatus for separating values from value-bearing materials comprising, a body member, a second member spaced from said body member to form a passageway therebetween, said second member having an upwardly and outwardly inclined lower face, a well communicating with said passageway, a body of mercury in said well and extending a substantial distance into said passageway, means for introducing value-bearing materials onto said body of mercury adjacent the entrance of said passageway, means for introducing water under pressure adjacent the entrance of said passageway to carry said value-bearing materials upwardly and outwardly through said passageway over said body of mercury, a riffle groove in said body member, arranged in the path of the discharge from said passageway, a body of mercury in said riffle groove, and means providing a passageway from said riffle groove to said well.

10. An apparatus for separating values from value-bearing materials comprising, a body member, a second member spaced from said body member to form a passageway therebetween, said second member having an upwardly and outwardly sloping lower face, a well communicating with said passageway, a body of mercury in said well and extending a substantial distance into said passageway, means for introducing value-bearing materials onto said body of mercury adjacent the entrance to said passageway, means for introducing water under pressure adjacent the entrance of said passageway to carry said value-bearing materials upwardly and outwardly through said passageway over said body of mercury, a riffle groove in said body member arranged in the path of the discharge from said passageway, a body of mercury in said riffle groove, and means for subjecting said discharge to the action of sprays of water under pressure as it passes over said riffle groove.

11. An apparatus for separating values from a mixture of water and value-bearing sand or other material comprising, a body having a riffle groove formed therein, said body being arranged so that said mixture must flow in substantially sheet form over said riffle groove, and means for directing fine sprays of water from generally opposite directions against said sand or other material as it flows over the riffle groove, one of said sprays being projected in a direction generally opposite to that of the flow of said mixture.

12. An apparatus for separating values from a mixture of water and value-bearing sand or other material comprising, a plurality of substantially horizontal plates spaced apart and arranged so that the mixture of water and value-bearing material must pass thereover in succession, and means for directing sprays of water under pressure against said mixture as it flows from one plate toward the next plate.

13. The method of separating values from value-bearing materials which comprises feeding a column of value-bearing materials onto a body of mercury, continuously washing away the base of said column of materials, and then passing the washed away materials over the surface of said body of mercury.

BENJAMIN BROMBERG.